April 28, 1959　　W. J. METRAILER　　2,884,303
HIGH TEMPERATURE BURNING OF PARTICULATE CARBONACEOUS SOLIDS
Filed March 6, 1956
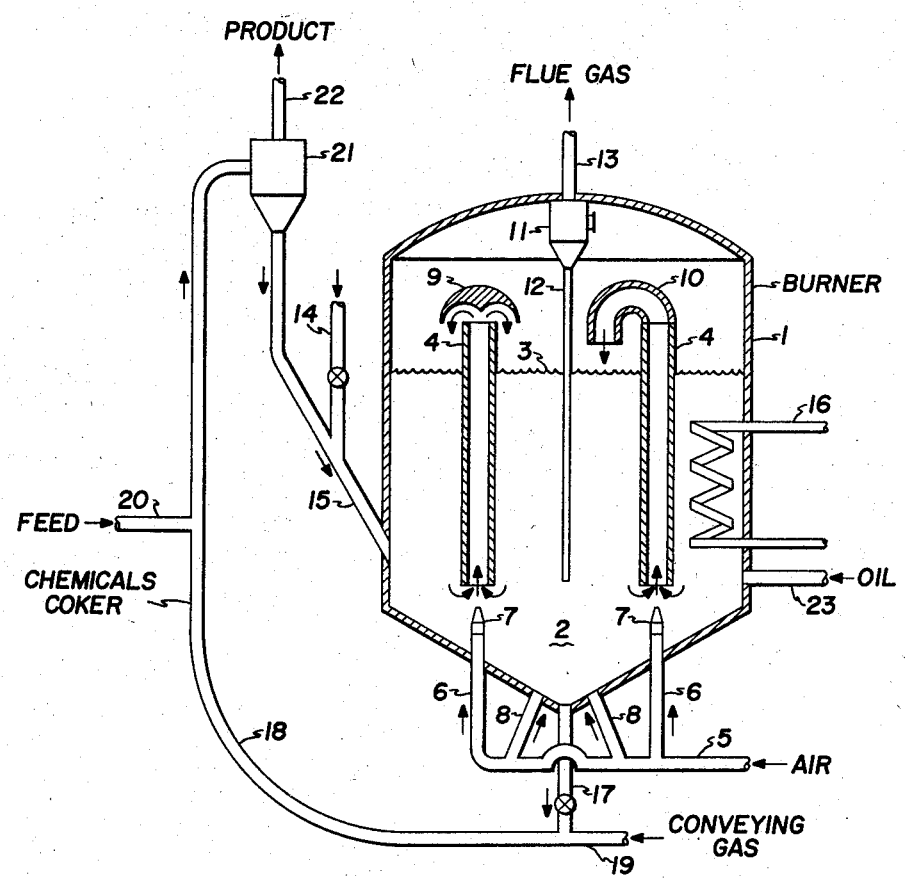
William J. Metrailer　Inventor
By L. A.

United States Patent Office 2,884,303
Patented Apr. 28, 1959

2,884,303

HIGH TEMPERATURE BURNING OF PARTICULATE CARBONACEOUS SOLIDS

William Joseph Metrailer, Baton Rouge, La., assignor to Esso Research and Engineering Company, a corporation of Delaware Application March 6, 1956, Serial No. 569,813

2 Claims. (Cl. 23—1)

The present invention relates to apparatus, and a process associated therewith, for burning finely divided carbon-containing solids. It is more particularly concerned with a fluidized solids apparatus for partially burning carbon-containing solids to supply heated solids to endothermic carbon producing processes such as processes for the high temperature conversion of hydrocarbon oils to produce chemicals.

In brief compass the process of this invention comprises maintaining a dense turbulent fluidized bed of particulate carbon-containing solids in a burning zone, passing an upwardly flowing, relatively dilute, stream of the solids through a narrowly confined, elongated, vertical passageway; the passageway extending from within the bed into a disperse solids phase thereabove, injecting substantial amounts of a free oxygen-containing gas along with solids from the bed upwardly into the lower portion of the passageway, deflecting solids issuing from the upper portion of the passageway down towards the bed, and removing gaseous products of combustion from the upper portion of the burning zone.

This invention has particular utility where it is necessary to obtain heat by the burning of carbon-containing solids at relatively high temperatures, such as in the production of steam for the generation of power. The apparatus of this invention is especially useful when associated with endothermic processes, usually fluidized solids processes, that are supplied with heat by circulating a stream of heated particulate solids through a reaction zone, such as gasification processes to produce water gas or oil gas, or residual oil coking processes to secure gas oils and naphthas. It also has use in the heating of carbon-containing solids so that the solids themselves may be calcined, i.e., heat soaked, or desulfurized. It may also be used to regenerate catalytic solids that have had carbon laid down thereon during a conversion reaction such as in the catalytic conversion of gas oils or residual oils. The present invention is particularly adapted to supply heat to endothermic carbon producing processes operating at temperatures above 1200° F., such as the coking of hydrocarbon oils, including naphthas, gas oils and residual oils, by contact with highly heated solids to produce chemicals, principally unsaturates and aromatics, and in methane cracking processes, etc.

Often it is necessary to burn carbon-containing solids at a relatively high temperature. Such burning is desirably accomplished in a manner to obtain the highest $CO_2/CO$ ratio possible in the gaseous products of combustion while using a minimum amount of oxygen. By burning to $CO_2$ over CO, an extra 10,143 B.t.u.'s per pound of carbon consumed is produced. The process is, therefore, more efficient. By increasing the $CO_2/CO$ ratio, less combustion air is required and the volume of flue gases is less, which means there is less heat loss with the flue gases and the entrained solids separating equipment may be smaller. When the burning process is associated with a carbon-producing conversion process, it is often desired to strike a balance between carbon production in the conversion step and carbon consumption in the burning step, in order to avoid the use of extraneous fuels. This is, many times, difficult to achieve unless the burning step is efficient.

In the burning of carbon at high temperatures, a high $CO_2/CO$ ratio is difficult to obtain. While the formation of $CO_2$ from carbon is the most rapid reaction, the high temperatures favor the reaction rates for the formation of CO from carbon, and for the reduction of $CO_2$ to CO by carbon.

Maximum $CO_2/CO$ ratios in the flue gases can be obtained by maintaining short contact times between oxygen and carbon, and by rapid removal of the combustion products. Short contact times are, however, difficult to achieve. For example, in a burner handling the solids as a fluid bed, high fluidizing gas velocities have been proposed to obtain short contact times. This results in excessive entrainment. The use of shallow beds has also been proposed, but with this arrangement the degree of contacting is poor. It has also been proposed in fluid bed designs to "dilute" the bed with inert non-carbonaceous solids to obtain a lower carbon concentration. This again reduces the degree of contacting and also presents a problem of separating the carbon and non-carbon containing solids.

The present invention proposes apparatus for the efficient high temperature burning of finely divided carbon-containing solids under fluidized conditions that overcomes these and other difficulties.

The following explanation of the drawing attached to and forming a part of this specification will serve to make this invention clear.

In the drawing, vessel 1 contains a fluidized bed of carbon-containing solids 2, having an upper level 3. Maintained within the bed are one or more "draft tubes" 4. According to prior practices, the solids in bed 2 would be burned and heated by being fluidized with a free oxygen-containing gas supplied to the base of vessel 1. This, however, results in unfavorable $CO_2/CO$ ratios in the gaseous combustion products, particularly when the temperature of the bed is maintained above 1300° F. According to the present invention, the short contact times necessary to achieve a favorable $CO_2/CO$ ratio are achieved by passing solids along with the combustion gas or air at a relatively high velocity, up through the elongated, narrowly confined passageways defined by draft tubes 4. The density of the high velocity suspension is preferably less than 20% of the fluid bed density. Substantially all of the free oxygen containing gas, e.g., air, usually about 0.25 to 2 s.c.f./lb. (standard cubic feet per pound) of carbon consumed, supplied by line 5, is directed by line 6 into the lower end portion of the draft tubes. The spacing of the air outlet nozzles 7 at the end of line 6 is such to induce solids from bed 2 into the draft tubes in the proper amount. This spacing may be made adjustable to give flexibility to the process. A minor amount of the combustion gas or other gases, such as steam, are supplied to the base of vessel 1 by lines 8 to maintain the fluidity of bed 2.

The combustion gases, along with the induced solids, pass upwardly through draft tubes 4 at a relatively high velocity and in, preferably, less than three seconds. The draft tubes extend above the level of the bed 3 into the disperse solids phase thereabove. The mixture emerging from the draft tubes is directed by baffles downwardly to the bed to secure a high degree of separation of the solids from the gases. The baffles used to deflect the solids may be of various designs, two being shown. One design comprises a suitably shaped hemsipherical deflector 9, centrally aligned and vertically spaced from the end of the draft tube. Another suitable design comprises simply a U-shaped conduit 10 affixed to the upper end of the draft tube.

By rapid passage through the draft tubes, a high heat release is obtained from the carbon-containing solids. These solids, upon issuing from the draft tube, fall into the fluidized bed reservoir for recirculation through the draft tubes. The gaseous products of combustion are withdrawn from the upper portion of vessel 1 through a cyclone separating system 11 wherein entrained solids are removed and returned to the bed via dipleg 12. Flue gases are vented from the cyclone system via line 13. The heat of the flue gases may be utilized by passing them through a waste heat boiler, or other heat exchange system if desired, before venting them to the atmosphere.

The apparatus is suited for the simple burning of carbon-containing solids such as coke to generate power. In this arrangement, the coke can be supplied to fluid bed 2 via lines 14 and 15 and the ash removed from the burner as fly-ash entrained in the flue gas. The heat released by the burning can be recovered by a steam generating coil 16, wholly or partially immersed in the fluid bed.

This invention is, however, most advantageously associated with a hydrocarbon conversion process wherein solids are used to supply heat to, and remove coke from, the conversion zone. The heat carrying solids used in such a conversion process may comprise sand, spent cracking catalyst, metal particles, etc., but preferably are coke particles produced by the process. As illustrated, the process can comprise a transfer line "chemicals coker" for the conversion of naphthas, gas oils, or residual oils to chemical products by high temperature pyrolysis. Such a process operates at a temperature in the range of about 1200–1600° F. Assuming coke particles are the heat carrying solids, coke is withdrawn in regulated amounts from the base of vessel 1 by line 17 and introduced into a transfer line reactor 18. This reactor comprises a narrowly confined, elongated, suitably refractory lined passageway. The solids from line 17 are picked up by conveying gas supplied by line 19, which may comprise steam, light hydrocarbon gases, inert gases, etc. The resulting relatively dilute suspension, e.g. having a density of about 10 lbs. per cu. ft., is passed at a relatively high velocity, e.g. 20 ft./sec., up through transfer line reactor 18. The material to be converted, e.g., a residual oil, is injected into transfer line reactor 18 by line 20 and upon contact with the heated solids, undergoes pyrolysis evolving lighter hydrocarbon vapors, and depositing coke on the solids. The reaction products issue from reactor 18 into a cyclone separating system 21 wherein the solids are separated and returned to vessel 1 by line 15. The conversion products, comprising aromatics and unsaturates, are recovered from the cyclone by line 22 and may be further processed as desired.

This combination of the burning vessel with a transfer line chemicals coker is particularly effective because it has been found that a transfer line coker requires a solids reservoir or surge arrangement to avoid fluctuations in flow rates. In this design, fluid bed 2 serves as such a reservoir. If excess carbon is produced by the conversion process, as when handing residual oils, this carbon may be burned if desired, and the extra heat removed via steam coil 16 or other cooling arrangement. In some cases, however, particularly when converting naphthas, the amount of coke laid down on the solids is insufficient to maintain the process in heat balance. In this case, the extra heat needed can be supplied by burning other fuels such as torch oil in the burner. This oil may be supplied directly by line 23 to fluid bed 2, or can be admitted with the gas supplied by line 5.

Instead of being associated with carbon-producing processes, this burner can also be used in the solids circulation system of carbon-consuming processes, such as the gasification of carbon with steam to produce water gas; or of steam, residual oil and carbon to produce oil gas. In this case the amount of carbon produced, if any, is insufficient and a substantial part, if not all, of the heat can be created by injecting extraneous fuels such as residual oil, coal, coke, etc. in the fluid bed. Such gasification processes customarily operate at temperatures above 1600° F. and usually above 2000° F. The burner must operate 100° to 400° F. above this. In such high temperature processes, because of the efficiency obtained by the present design, this invention has particular utility.

Table I presents a summary of the pertinent range of operating conditions applicable to the present invention, and presents a specific example thereof.

Table I

|  | Broad range | Preferred Range | Example |
|---|---|---|---|
| Solid | | | Fluid Coke. |
| Carbon Content, Wt. Percent. | above 1.0 | above 2.0 | 100. |
| Particle Size, microns | below 1,000 | below 500 | 50–500. |
| Inlet Temperature, ° F | | above 1,000 | 1,200. |
| Circulation rate,[1] lb./min. in 100 b./d. plant. | | | 400. |
| Fluid Bed Conditions: | | | |
| Density, lbs./cu. ft. | 20–100 | 40–80 | 40–60. |
| Fluidizing gas velocity, ft./sec. | 0.1–10 | 0.1–3 | 0.1–1.0. |
| Temperature, ° F | above 2,000 | above 1,300 | 1,300–1,600. |
| Pressure at top, atm. | below 6 | below 2 | 1.5. |
| Draft Tube Conditions: | | | |
| Solids density, lbs./cu. ft. | 0.5–10 | 1–7 | 1. |
| Solids velocity, ft./sec. | 10–60 | 20–45 | 30. |
| Mass flow rate, lbs./min./sq. ft. | 1,000–15,000 | 2,000–10,000 | 3,000. |
| ΔP. over draft tube, lb./ft.²/ft. | 0.5–15 | 1.0–10 | 2.5. |
| Flue Gas: | | | |
| Solids content, lbs./cu. ft. | under 0.01 | under 0.001 | 0.0005. |
| $CO_2/CO$ ratio | above 5 | above 6 | 7. |
| $O_2$ content | below 5 | below 2.5 | 2.0. |
| Oxygen in Combustion Air, vol. percent. | above 5 | above 20 | 21%. |

[1] When used with transfer-line chemical coker converting residual oil

Having described this invention, what is sought to be protected by Letters Patent is succinctly set forth in the following claims.

What is claimed is:

1. A process for burning solids containing over 1.0 wt. percent carbon and having a particle size under 1000 microns, which comprises maintaining a dense turbulent fluidized bed of said solids at a temperature above 1300° F. in a burning zone, passing in less than three seconds an upwardly flowing stream of solids from said bed through a narrowly confined elongated vertical passageway at a velocity in the range of 10 to 60 ft./sec. and at a density less than 20% of the density of said bed, said passageway extending from within said bed into a disperse solids phase thereabove, injecting 0.25 to 2 standard cubic feet of a free oxygen-containing gas per pound of solids circulated through said passageway along with solids from said bed upwardly into the lower portion of said passageway, deflecting solids issuing from the upper portion of said passageway down towards said bed, and removing from the upper portion of said burning zone gaseous products of combustion having a $CO_2/CO$ ratio above 5 and less than 5 vol. percent $O_2$.

2. The processs of claim 1 wherein said burning zone is associated with an endothermic carbon producing process operating at a temperature above 1200° F., and said solids are circulated through said endothermic process supplying heat thereto and removing carbon therefrom.

References Cited in the file of this patent
UNITED STATES PATENTS

| | | |
|---|---|---|
| 1,969,501 | Chapman | Aug. 7, 1934 |
| 2,445,328 | Keith | July 20, 1948 |
| 2,582,712 | Howard | Jan. 15, 1952 |
| 2,765,260 | Yoder | Oct. 2, 1956 |
| 2,788,314 | Schmalfeld | Apr. 9, 1957 |